United States Patent
Kim et al.

(10) Patent No.: US 11,543,853 B2
(45) Date of Patent: Jan. 3, 2023

(54) PULSE COUNTING APPARATUS OPERATING AT LOW POWER AND OPERATION METHOD THEREOF

(71) Applicant: Dialog Semiconductor Korea Inc., Gyeonggi-do (KR)

(72) Inventors: Hee Jun Kim, Yongin-si (KR); Eun Suk Park, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 6 days.

(21) Appl. No.: 16/871,103

(22) Filed: May 11, 2020

(65) Prior Publication Data
US 2020/0363834 A1    Nov. 19, 2020

(30) Foreign Application Priority Data
May 13, 2019   (KR) ......................... 10-2019-0055491

(51) Int. Cl.
| | |
|---|---|
| G06F 1/14 | (2006.01) |
| G06F 9/44 | (2018.01) |
| G06F 1/32 | (2019.01) |
| G06F 9/4401 | (2018.01) |
| G06F 1/3206 | (2019.01) |

(52) U.S. Cl.
CPC .............. *G06F 1/14* (2013.01); *G06F 1/3206* (2013.01); *G06F 9/4403* (2013.01)

(58) Field of Classification Search
CPC ........ G06F 1/14; G06F 1/3206; G06F 1/3287; G06F 9/4403; G06F 9/4401; G06F 9/4418
See application file for complete search history.

(56) References Cited

U.S. PATENT DOCUMENTS

| | | | | |
|---|---|---|---|---|
| 5,987,339 | A * | 11/1999 | Asano ................. | H04W 52/029 455/574 |
| 7,561,541 | B2 * | 7/2009 | Ferchland ......... | H04W 52/0287 370/311 |
| 9,510,289 | B1 * | 11/2016 | de Ruijter ............... | H03L 7/148 |
| 2002/0091961 | A1 * | 7/2002 | Inoue ..................... | G06F 1/324 713/601 |

FOREIGN PATENT DOCUMENTS

| | | |
|---|---|---|
| KR | 1019980064638 | 10/1998 |
| KR | 1020020054572 | 7/2002 |

OTHER PUBLICATIONS

Korean Office Action, Application No. 10-2019-0055491, Applicant: Dialog Semiconductor Korea Inc., dated Feb. 20, 2020, 5 pages.

* cited by examiner

*Primary Examiner* — Ji H Bae
*Assistant Examiner* — Cheri L Harrington
(74) *Attorney, Agent, or Firm* — Saile Ackerman LLC; Stephen B. Ackerman

(57) ABSTRACT

A pulse counting apparatus operating at a low power and an operation method thereof are provided. The pulse counting apparatus includes a pulse counter configured to count a number of pulses inputted from outside of the pulse counting apparatus and generate an interrupt signal; a timer unit configured to generate a wake-up signal according to a preset time; a real time clock (RTC) configured to serve as a clock of the pulse counter and the timer unit; and a processor configured to switch from a sleep mode to an active mode when the interrupt signal or the wake-up signal is generated.

11 Claims, 4 Drawing Sheets

PULSE COUNTING APPARATUS OPERATING AT LOW POWER AND OPERATION METHOD THEREOF

This application claims priority to Korean Patent Application No. 10-2019-0055491, filed on May 13, 2019, which application is hereby incorporated herein by reference.

TECHNICAL FIELD

The present disclosure relates to pulse counter technologies. More particularly, the present disclosure relates to a pulse counting apparatus and a method for counting pulses operating at a low power.

BACKGROUND

The statements in this section merely provide background information related to the present disclosure, and do not necessarily constitute prior art.

A pulse counter is a device for adding or subtracting the number of pulses inputted from outside. The pulse counter requires a clock to count pulses. Generally, the pulse counter uses a clock in a processor.

The processor generally controls components connected to the processor and has its own clock for this purpose. The clock may count a time, and the processor and peripheral devices thereof may use the time of the clock as a reference for operations.

The pulse counting apparatus generally operates with the processor's own clock as the clock. To count pulses, the pulses need to be counted in a state where power is supplied to the processor as well as the peripheral devices. Therefore, there is a problem in that an additional power is consumed besides the power necessary for counting pulses.

In order to reduce the power consumption, there is a method of waiting in a sleep mode for most of the time, waking up if necessary, performing a necessary operation, and then entering a power saving mode again. However, when the pulse counting apparatus takes the clock of the processor as the clock, because the processor has to repeatedly sleep and wake up with the peripheral devices of the processor, there is a limitation in reducing the power consumption.

In addition, when the own clock of the processor is used as the clock, the processor serves as the clock and controls components connected to the processor. When the processor simultaneously serves as the clock and performs a control operation of the components, there is a problem in that the processor is overloaded or causes a slight error in the control operation of the components connected to the processor. In addition, when only one clock is used, it is difficult to optimize the power consumption according to various frequencies of pulses.

Therefore, prior art has drawbacks and is in urgent need of improvement.

SUMMARY

In view of the above, an object of the disclosure is to provide a pulse counting apparatus operating at low power by dividing a power supply area of a pulse counting apparatus into two areas. The first area includes a pulse counter and a real time clock (RTC) and the second area includes a processor. The mode of the pulse counting apparatus is divided into a sleep mode in which power is supplied only to the first area and a power is cut off in the second area, and an active mode in which power is supplied even to the second area.

Another object of the disclosure is to provide an apparatus and a method for optimizing power consumption by preventing an overload of a processor and reducing an error of a control operation on components in a pulse counting apparatus by selecting one of an RTC or an oscillator as a clock of a pulse counter according to frequency of a pulse to be counted.

In accordance with at least one embodiment, the present disclosure provides a pulse counting apparatus. The pulse counting apparatus includes a pulse counter configured to count a number of pulses inputted from outside of the pulse counting apparatus and generate an interrupt signal; a timer unit configured to generate a wake-up signal according to a preset time; a real time clock (RTC) configured to serve as a clock of the pulse counter and the timer unit; and a processor configured to switch from a sleep mode to an active mode when the interrupt signal or the wake-up signal is generated.

In accordance with another aspect of the disclosure, a method for counting pulses includes counting a number of pulses inputted from outside of the pulse counting apparatus and generating an interrupt signal according to an interrupt signal generation condition; generating a wake-up signal according to a preset time; and switching a processor from a sleep mode to an active mode when the interrupt signal or the wake-up signal is generated, wherein power of the processor is off in the sleep mode.

As described above, according to the embodiment, a power source area in a pulse counting apparatus is divided into two areas: the first area and the second area. Pulses are counted by supplying power to the first area including components necessary for counting pulses at normal times. Components of the second area are woken up as needed, and thus power consumption may be reduced.

In addition, it is possible to prevent an overload of a processor and reduce an error of a control operation of the processor by using either an RTC or an oscillator as a clock of a pulse counter rather than a processor's own clock according to frequency of a pulse to be counted. Thus, the power consumption may be optimized.

DETAILED DESCRIPTION

Figure 1:
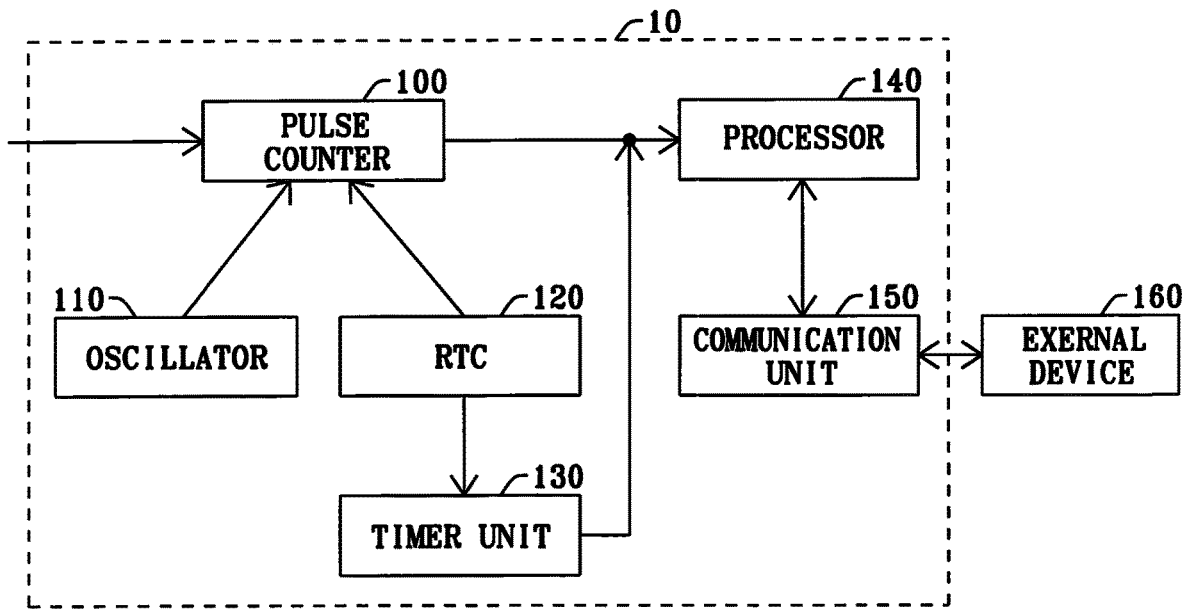
FIG. 1 is a diagram illustrating a configuration of a pulse counting apparatus according to an embodiment of the disclosure.

Hereinafter, at least one embodiment of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to one or more units for processing at least one function or operation, which may be implemented by hardware, software, or a combination particular. The detailed description, which will be given below with reference to the accompanying drawings, is intended to explain exemplary embodiments of the present disclosure and is not intended to represent the only embodiments in which the present disclosure may be practiced.

FIG. 1 is a diagram illustrating a configuration of a pulse counting apparatus according to an embodiment of the disclosure.

Referring to FIG. 1, according to an embodiment, a pulse counting apparatus 10 operating at a low power includes a pulse counter 100, an oscillator 110, a real time clock (RTC) 120, a timer unit 130, a processor 140, a communication unit 150, and a memory (not shown). Pulses are input to the pulse counter 100 from outside of the pulse counting apparatus 10. An external device 160 may be connected to the communication unit 150, and may transmit or receive data, and information about a network.

The pulse counter 100 is located in a first area 210 and counts the number of pulses inputted from outside of the pulse counting apparatus 10 to subtract or add the number of pulses to a register (not shown). The pulse counter 100 may also operate when the processor 140 is in a sleep mode, and generate and transmit an interrupt signal to the processor 140. Here, the interrupt signal is a signal for switching the processor 140 from the sleep mode to an active mode. In addition, the pulse counter 100 may operate with either the RTC 120 or the oscillator 110 as a clock according to frequency of a pulse.

The oscillator 110 may be located in the first area 210 and generate an AC signal by using an electron tube, a semiconductor, or etc. The oscillator 110 may be classified into a sine wave oscillator, a rectangular wave oscillator, and a pulse oscillator according to an output waveform, but the pulse oscillator is mainly used as the clock. That is, the oscillator 110 may operate as the clock of the pulse counter 100 instead of the RTC 120. The oscillator 110 may serve as the clock in a higher frequency range (for example, 10 to 15 MHz) than the RTC 120. However, because the oscillator 110 generally consumes more power than the RTC 120, the oscillator 110 is mainly used when counting pulses having higher frequency than the frequency of pulses that the RTC 120 may count. On the other hand, when the RTC 120 is operating as the clock of the pulse counter 100, power supply to the oscillator 110 is cut off for power saving.

The RTC 120 may be located in the first area 210 and provide a clock which may operate as the clock of the pulse counter 100 and the timer unit 130.

In general, an RTC may serve as a clock of components by providing a clock using a crystal oscillator with a frequency of 32.768 kHz, and providing a clock that is a reference for operation within the pulse counting apparatus. Because the RTC is a standard for various operations, the RTC 120 must be able to operate to maintain the clock at all times even if power supply to a processor is cut off. Using the RTC as the clock may reduce power consumption as compared to power consumption using an own clock of the processor consuming a greater amount of power to control peripheral devices. The RTC may also accurately measure the clock and reduce control errors due to an overload of the processor.

In the embodiment of the disclosure, the RTC 120 is connected to the pulse counter 100 and the timer unit 130, operates as the clock, and operates in a sleep mode of the processor 140. The pulse counter 100 may count pulses according to a frequency of the RTC 120, and the timer unit 130 may generate a wake-up signal according to the clock of the RTC 120. The RTC 120 may use a crystal oscillator of 32.768 kHz, in which case the pulse counter 100 may count pulses having frequencies up to 16.384 kHz which is half the clock frequency. When the RTC 120 is used as the clock of the pulse counter 100, the power consumption for counting pulses may be reduced as compared with the case where the own clock of the processor 140 is used.

The timer unit 130 is located in the first area 210 and operates when the processor 140 is in the sleep mode. The timer unit 130 may generate a wake-up signal according to a preset time and may transmit the wake-up signal to the processor 140. Here, the wake-up signal is a signal for switching the processor 140 from the sleep mode to the active mode. However, after the processor 140 has switched to the active mode by the interrupt signal of the pulse counter 100, the operation of the processor 140 will not be affected even if the wake-up signal is transmitted to the processor 140 again.

The processor 140 is located in a second area 220 and generally controls components within the pulse counting apparatus 10. The processor 140 may operate in the sleep mode or the active mode. In the sleep mode, power supply to the processor 140 is cut off. In the active mode, power supply to the processor 140 is provided. When the processor 140 is in the active mode, a count value may be transmitted to the external device 160 via the communication unit 150. The processor 140 may also select either the RTC 120 or the oscillator 110 as the clock of the pulse counter 100 according to frequency of a pulse. For example, under the control of the processor 140, when the frequency of the pulse is lower than 16.384 kHz, the RTC 120 may serve as the clock for the pulse counter 100. When the frequency of the pulse is greater than 16.384 kHz, the oscillator 110 may serve as the clock for the pulse counter 100. The processor 140 may also set an interrupt signal generation condition of the pulse counter 100 and a wake-up signal generation time of the timer unit 130. In addition, the processor 140 may execute a full boot code in the active mode if there is no change in the count value. Here, the count value means the number of accumulated pulses of the pulse counter 100.

The communication unit 150 is a component that is located in the second area 220 and enables the pulse counting apparatus 10 to connect to and to communicate with the external device 160 via a wired or wireless network. The communication unit 150 is connected to the processor 140 and allows the processor 140 to transmit the count value to the external device 160. The communication unit 150 may not operate when the processor 140 is in the sleep mode and may be powered on and operate when the processor 140 is in the active mode.

The external device 160 is a device that the pulse counting apparatus 10 uses through the communication unit 150 via a wired/wireless network. The external device 160 may be connected to the pulse counting apparatus 10 by a coaxial cable, an optical cable, or the like when connected by wired. When connected wirelessly, the external device 160 may be connected by long term evolution (LTE), 5G, Wi-Fi, Bluetooth, etc. When the external device 160 and the pulse counting apparatus 10 are connected by Wi-Fi, the external device 160 may be implemented as an access point (AP). However, the disclosure is not necessarily limited to this, but may be implemented as any device that connects the pulse counting apparatus 10 via the wired/wireless network and is used by the pulse counting apparatus 10, as described above.

The memory (not shown) is located in the second area 220 and includes a code for the active mode and the full boot code.

The code for the active mode is a code for providing power supply to the second area 220 including the processor 140 awaked from the sleep mode, such that the processor 140 may control other components. The full boot code is a code for initializing and rebooting components of the processor 140, the communication unit 150 and the second area 220 and reconnecting communication between the communication unit 150 and the external device 160.

Specifically, when the communication unit 150 uses the wireless network, if the full boot code is executed, the communication unit 150 exchanges a key value for network connection with the external device 160 again. The key value held by the communication unit 150 is replaced with a key value received from the external device 160 connected to the communication unit 150 again. Here, the key value is a value used for encryption to authenticate the network as well as to prevent data leakage in a wireless communication process.

Hereinafter, the reason why the RTC 120 or the oscillator 110 is selected as the clock of the pulse counter 100 according to the embodiment of the disclosure will be described.

The RTC 120 may have a driving frequency of 32.768 KHz and the oscillator 110 may have a driving frequency of 10 to 15 MHz. The RTC 120 and the oscillator 110 may count pulses within a frequency range that is half the driving frequency. That is, the oscillator 110 may count pulses in a wide frequency band as compared with the RTC 120. On the other hand, since the consumed power is substantially proportional to the driving frequency, the consumed power of the oscillator 110 is higher than that of the RTC 120.

The processor 140 may select either the RTC 120 or the oscillator 110 as the clock of the pulse counter 100 according to the frequency of the pulse. When the frequency of the pulse is low, the RTC 120 is selected as the clock, and when the frequency of the pulse is high, the oscillator 110 is selected as the clock, and thus the power consumption in counting the pulses may be optimized.

Figure 2:
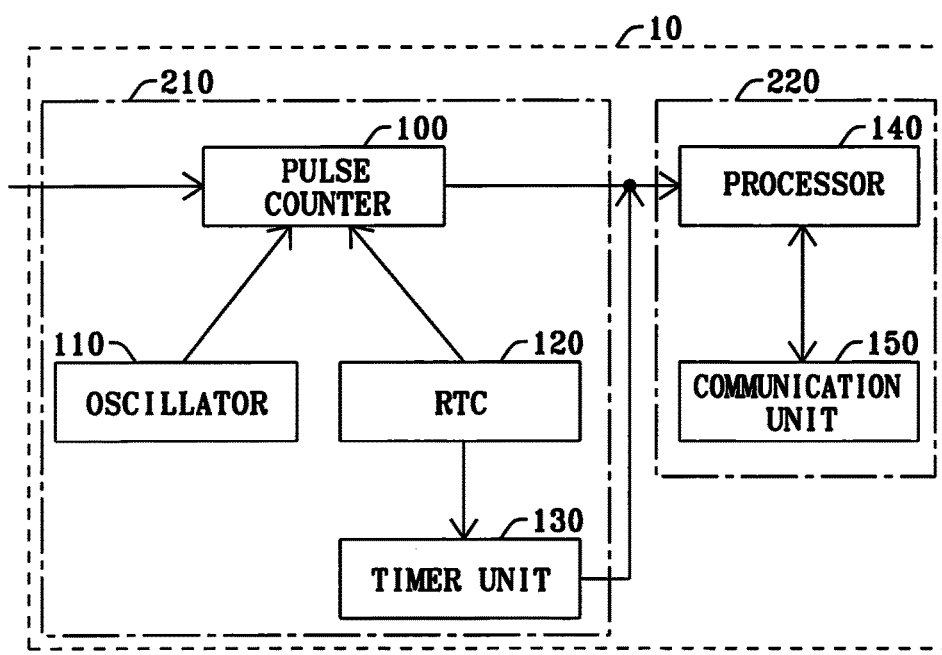
FIG. 2 is a diagram for explaining a pulse counting apparatus that separates a power source area and operates according to an embodiment of the disclosure.

FIG. 2 is a diagram for explaining a pulse counting apparatus that separates a power source area and operates according to an embodiment of the disclosure.

Referring to FIG. 2, the pulse counting apparatus 10 includes a first area 210 and a second area 220. The first area 210 may include the pulse counter 100, the oscillator 110, the RTC 120, and the timer unit 130. The second area 220 may include the processor 140, the communication unit 150, and a memory, and may further include other configurations such as a sensor, etc.

When the processor 140 is in a sleep mode, power supply is always provided in the first area 210 while power supply is cut off. When the processor 140 is in an active mode, power supply is provided in the second area 220. Power supply is provided to only the first area 210 having components necessary for counting pulses at normal times, and thus pulses may be counted with only the minimum power.

First, when the processor 140 is in the sleep mode, power supply is provided to the pulse counter 100, the RTC 120, and the timer unit 130 in the first area 210. When the processor 140 selects the oscillator 110 as a clock of the pulse counter 100, power supply is also provided to the oscillator 110 in the sleep mode of the processor 140. Power supply is cut off in the second area 220 including the processor 140 and the communication unit 150.

The pulse counter 100 may count pulses inputted from outside and generate an interrupt signal when a preset requirement is met. The preset requirement is set by the processor 140.

On the other hand, when a preset time has elapsed, the timer unit 130 may generate a wake-up signal using the RTC 120 as a clock. The preset time is set by the processor 140.

The interrupt signal or wake-up signal may be transmitted to the processor 140 to switch the processor 140 from the sleep mode to the active mode.

Power supply is provided to the second area 220 including the processor 140 and the communication unit 150 in a process of switching the processor 140 from the sleep mode to the active mode. At this time, the processor 140 may transmit a count value of the pulse counter 100 to the external device 160 through the communication unit 150.

Hereinafter, the power consumption according to the related art and the embodiment of the disclosure will be compared.

Tables 1, 2 and 3 below are tables for comparing the power consumption of a pulse counting apparatus according to the related art and the pulse counting apparatus according to the embodiment of the disclosure.

TABLE 1

|  | Related art | Embodiment of the disclosure |
|---|---|---|
| Sleep mode operation time (T1) [ms] | 0 | 1,950 |
| Active mode Operation Time (T2) [ms] | 2,000 | 50 |
| Count value Transmission Time (T3) [ms] | 20 | 20 |
| Average current [mA] | 15.90 | 1.28 |
| Average power consumption [uW] | 252.81 | 1.638 |

TABLE 2

|  | Related art | Embodiment of the disclosure |
|---|---|---|
| Sleep mode Operation time (T1) [ms] | 0 | 9,950 |
| Active mode Operation time (T2) [ms] | 10,000 | 50 |
| Count value Transmission time (T3) [ms] | 20 | 20 |

TABLE 2-continued

|  | Related art | Embodiment of the disclosure |
|---|---|---|
| Average current [mA] | 15.18 | 0.26 |
| Average power consumption [uW] | 230.43 | 0.068 |

TABLE 3

Average current reference table

| Sleep mode current (I1) [mA] | 0.005 |
|---|---|
| Active mode current (I2) [mA] | 15 |
| Count value Transmission current (I3) [mA] | 90 |

Table 1 shows time and power required to transmit the count value to the external device every two seconds in comparison with the related art and the embodiment of the disclosure.

Table 2 shows time and power required to transmit the count value to the external device every ten seconds in comparison with the related art and the embodiment of the disclosure.

Table 3 is a reference table showing the average current for each time in Tables 1 and 2 to calculate the average power.

Here, the related art means a pulse counting apparatus that uses its own clock in a processor as a clock of a pulse counter.

Referring to Tables 1 and 3, the average current flowing through the apparatus is expressed by Equation 1 as follows.

$$I_{avg}=((T1*I1)+(T2*I2)+(T3*I3))/(T1+T2+T3) \quad \text{Equation 1:}$$

Assuming that the average power is the power consumed when the average current flows through a resistor of 1 ohm, the average power is expressed by Equation 2 as follows.

$$P_{avg}=1*(I_{avg})^2 \quad \text{Equation 2:}$$

In Table 1, when the count value is transmitted to the external device 160 every two seconds, the sleep mode time, the active mode time, and the count value transmission time of the related art are 0 ms, 2,000 ms, and 20 ms, respectively. The current in the sleep mode of the related art, the current in the active mode, and the current for transmitting the count value are 0.005 mA, 15 mA, and 90 mA, respectively. The average current in the apparatus according to the related art is 15.9 mA, and the average power for the resistance of 1 ohm is 252.81 microwatts (uW).

Likewise, when each time and each current in the embodiment of the disclosure are calculated, the average current is 1.28 mA and the average power for the resistance of 1 ohm is 1.638 uW. This shows that pulses may be counted and transmitted to the external device 160 at a power of 100 times less than 252.81 uW that is the average power of the related art.

In Table 2, when the count value is transmitted to the external device 160 every 10 seconds, the sleep mode time, the active mode time, and the count value transmission time of the related art are 0 ms, 10,000 ms, and 20 ms, respectively. The current in the sleep mode, the current in the active mode, and the current for transmitting the count value of the related art are 0.005 mA, 15 mA, and 90 mA, respectively. The average current in the apparatus according to the related art is 15.18 mA and the average power for the resistance of 1 ohm is 230.43 uW.

Likewise, when each time and each current in the embodiment of the disclosure are calculated, the average current is 0.26 mA and the average power for the resistance of 1 ohm is 0.068 uW. This shows that the pulses may be counted and transmitted to the external device 160 at a power of 1000 times less than 252.81 uW that is the average power of the related art.

That is, by separating the power source area according to the embodiment of the disclosure, the pulses may be counted by only the components of the first area 210 necessary for counting pulses at normal times, and the power consumption of the pulse counting apparatus 10 may be reduced by operating the processor 140 and the communication unit 150 of the second area 220 when necessary, and transmitting the count value to the outside.

Figure 3:
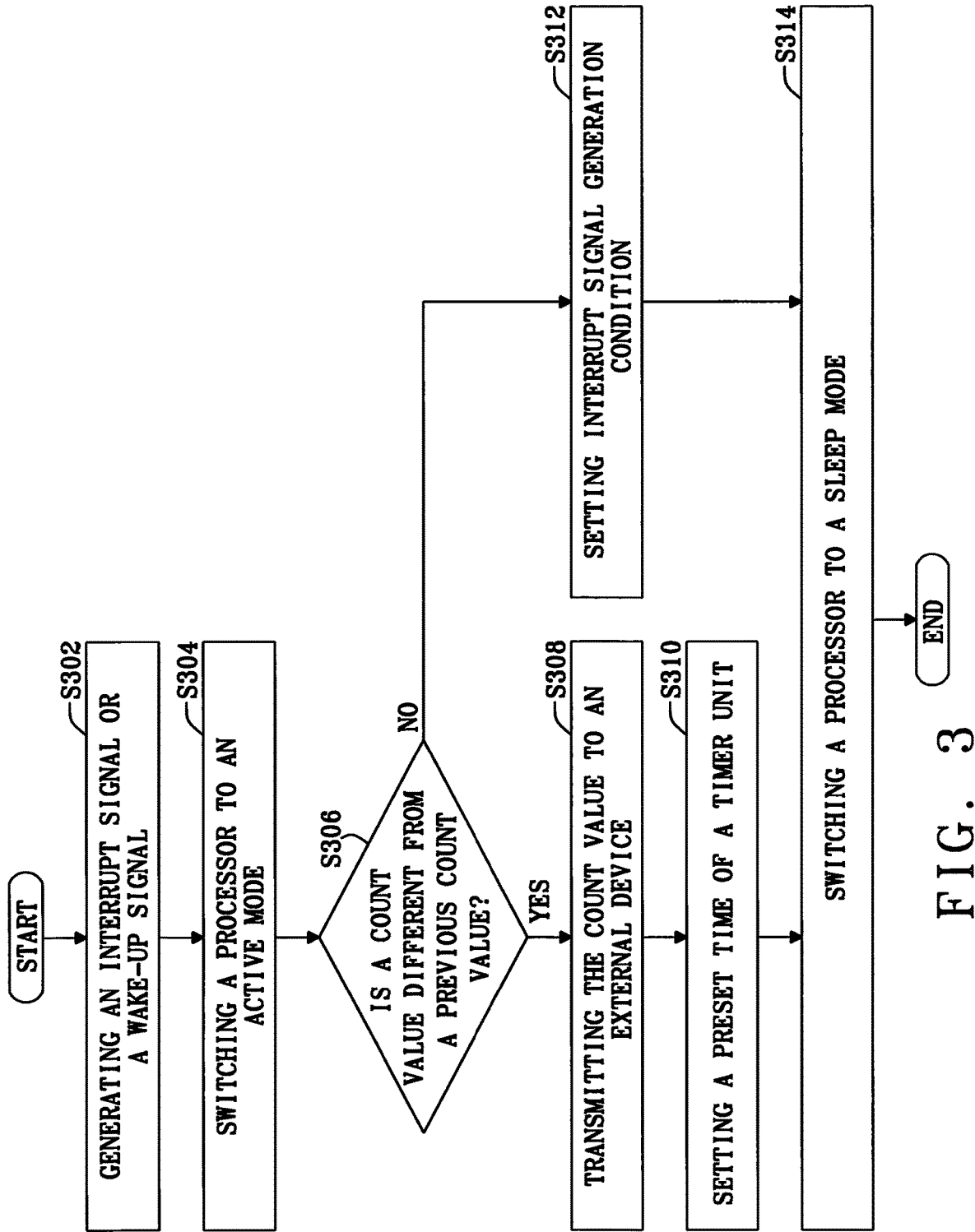
FIG. 3 is a flowchart illustrating a process of counting pulses and transmitting count values to an external device repeatedly when a communication unit is not disconnected from an external device in a network according to an embodiment of the disclosure.

FIG. 3 is a flowchart illustrating a process of counting pulses and transmitting count values to an external device repeatedly when the communication unit 150 is not disconnected from the external device 160 in a network according to an embodiment of the disclosure.

First, in a sleep mode of the processor 140, it is confirmed whether an external pulse is inputted to the pulse counter 100 or a preset time of the timer unit 130 has elapsed. Then the pulse counting apparatus generates an interrupt signal or a wake-up signal (S302). When the external pulse is inputted to the pulse counter 100 and a preset interrupt signal generation condition is satisfied before a wake-up signal generation condition, the pulse counter 100 generates the interrupt signal and transmits the interrupt signal to the processor 140. On the other hand, when the preset time of the timer unit 130 has elapsed and the wake-up signal generation condition is satisfied before the interrupt signal generation condition, the timer unit 130 generates the wake-up signal and transmits the wake-up signal to the processor 140.

When the interrupt signal or the wake-up signal is generated, the processor 140 enters the active mode from the sleep mode (S304). That is, when the processor 140 receives the interrupt signal or the wake-up signal, the processor 140 enters the active mode from the sleep mode. When the processor 140 enters the active mode, power is applied to all the components including the processor 140 and the communication unit 150 in the second area 220 as well as components in the first area 210, and the processor 140 may control the above components.

The processor 140 compares a previous count value has been transmitted to the external device 160 with a count value which is the number of pulses to determine whether the count value is different from the previous count value (S306).

When the count value of the pulse counter 100 is different from the previous count value, the processor 140 transmits the count value to the external device 160 (S308). The processor 140 transmits the count value to the external device 160 via the communication unit 150 that may use a wired/wireless network.

After transmitting the count value, the processor 140 resets a preset time which is the wake-up signal generation condition of the timer unit 130 (S310). That is, when the count value is expected to change, the processor 140 is switched from the sleep mode to the active mode according to the wake-up signal other than the interrupt signal. This is because, if a change in the count value is expected, switching the processor 140 to the active mode using the interrupt signal will consume more power due to more frequent active mode entry than using the wake-up signal.

On the other hand, when the count value of the pulse counter 100 is equal to the previous count value, the processor 140 sets the number of pulses that is the interrupt signal generation condition of the pulse counter 100 (S312). When the processor 140 is switched to the active mode by the wake-up signal even though there is no change in the count value, more power is consumed due to more frequent active mode entry than switched by the interrupt signal. That is, when the count value is expected to not to change, the processor 140 is switched to the active mode according to the interrupt signal other than the wake-up signal.

The processor 140 sets the generation condition of the interrupt signal or the wake-up signal, and then switches from the active mode to the sleep mode (S314).

Figure 4:
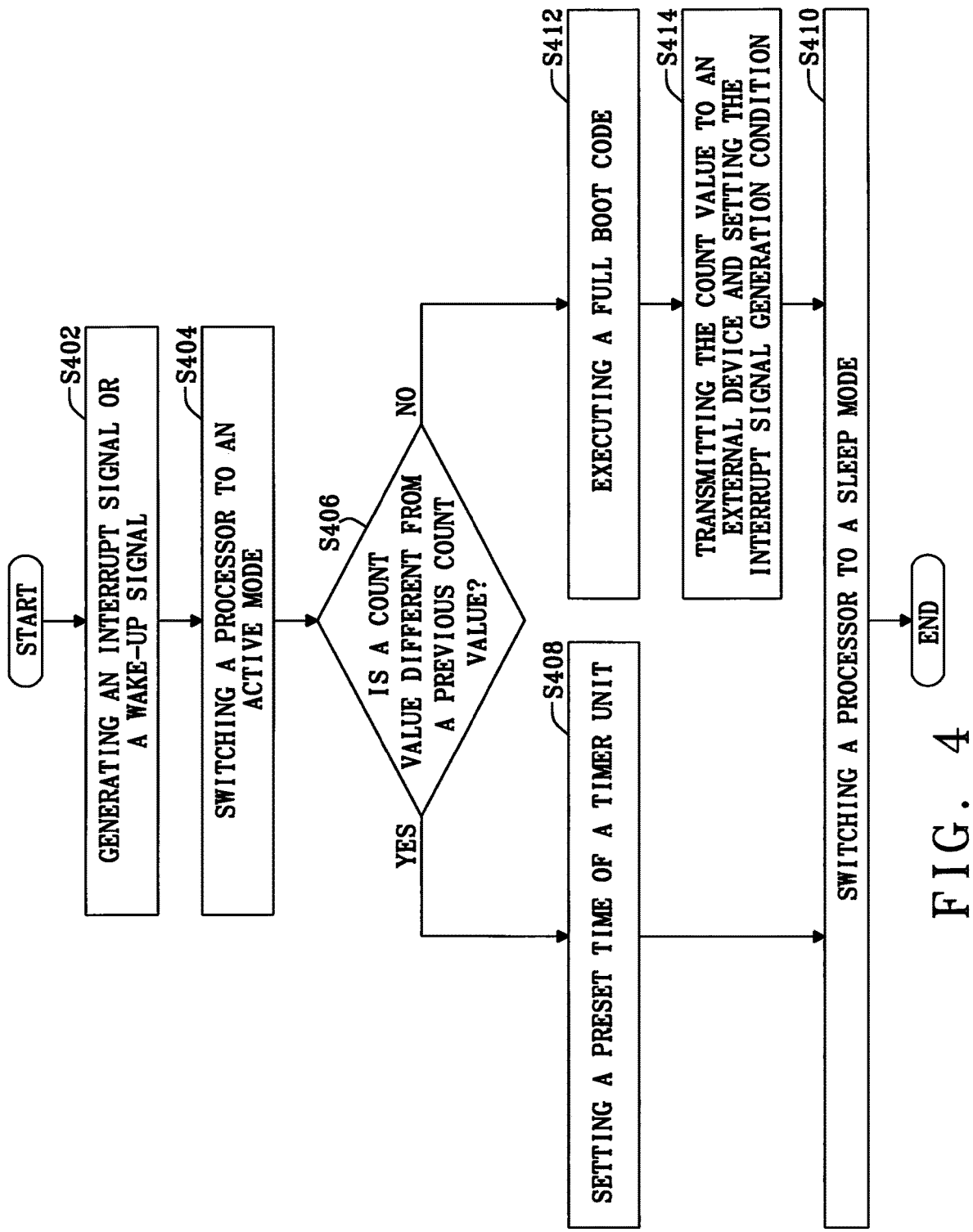
FIG. 4 is a flowchart illustrating a process of transmitting a count value to an external device when a pulse input and a communication unit may be disconnected from the external device in a network according to an embodiment of the disclosure.

FIG. 4 is a flowchart illustrating a process of transmitting a count value to the external device 160 when a pulse inputs and the communication unit 150 may be disconnected from the external device 160 in a network according to an embodiment of the disclosure.

A process for the processor 140 of entering an active mode from a sleep mode and determining whether the count value is changed (S402, S404, and S406) are described with reference to FIG. 3, and thus descriptions thereof are omitted. However, even when the processor 140 enters the active mode, power supply is not provided to the communication unit 150 immediately.

When the count value of the pulse counter 100 is different from the previous count value, the processor 140 sets a wake-up signal generation time of the timer unit 130 (S408). The processor 140 does not transmit the count value to the external device 160.

On the other hand, when the count value of the pulse counter 100 is equal to the previous count value, the processor 140 executes a full boot code (S412). When the full boot code is executed, power supply is provided to the communication unit 150, and the communication unit 150 reconnects the external device 160 via a wired/wireless network. When the communication unit 150 uses the wireless network, the communication unit 150 exchanges a key value with the external device 160 to establish a network connection again.

Thereafter, the processor 140 transmits an accumulated count value of the pulse counter 100 to the external device 160 through the communication unit 150. The processor 140 sets the number of pulses which is an interrupt signal generation condition of the pulse counter 100 (S414).

The processor 140 sets the generation condition of the interrupt signal or the wake-up signal, and then switches from the active mode to the sleep mode (S410).

Figure 5:
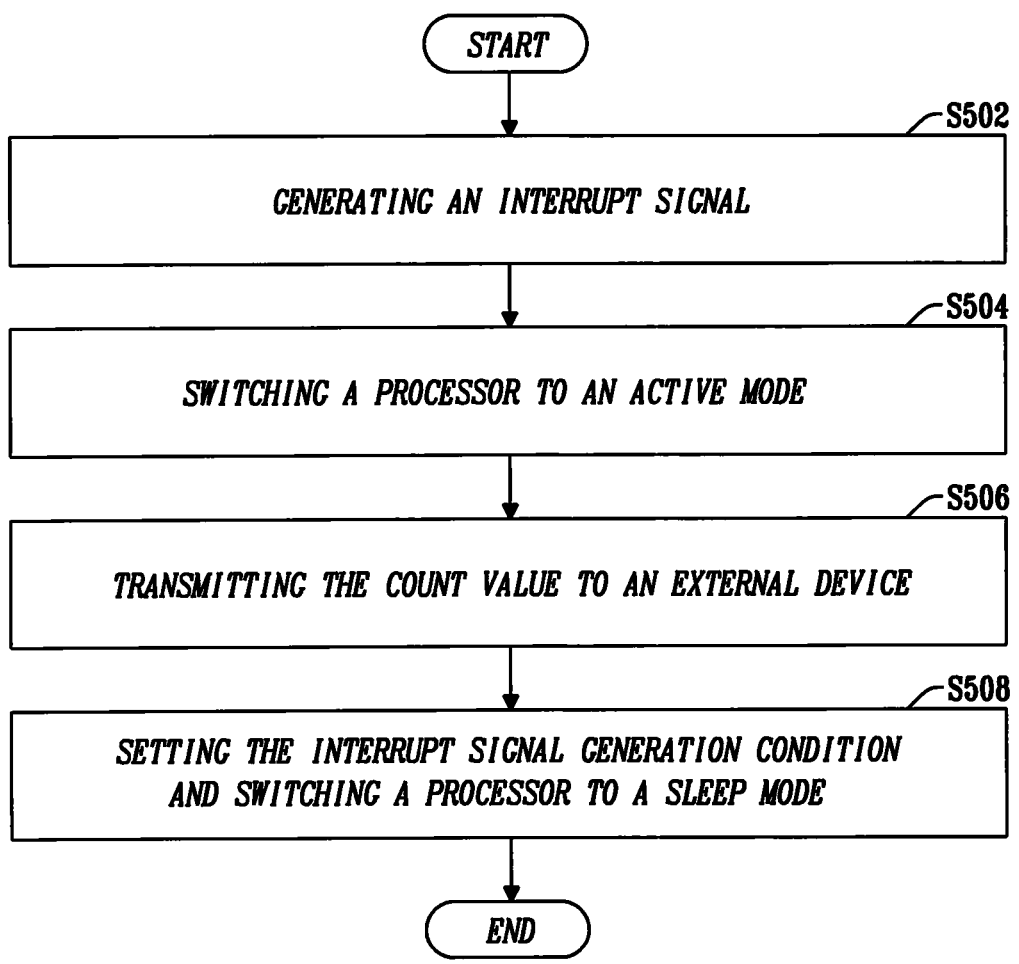
FIG. 5 is a flowchart illustrating a process in which a pulse counting apparatus counts low frequency pulses or transmits

FIG. 5 is a flowchart illustrating a process in which a pulse counting apparatus counts low frequency pulses and transmits a count value to an external device according to the number of pulses according to an embodiment of the disclosure.

When the frequency of a pulse is low, for example, when a time interval between a start point of one pulse and a start point of a next pulse is longer than a wake-up signal generation time, that is, when period of the pulses is longer than a predetermined value, because it is inefficient to set the wake-up signal generation time of the timer unit 130, the processor 140 enters an active mode only by an interrupt signal. This also applies to the case where the count value is transmitted to the external device 160 according to the count value.

First, when a pulse is inputted to the pulse counter 100 in a sleep mode of the processor 140, a pulse counting apparatus generates an interrupt signal (S502). When an external pulse is input to the pulse counter 100 and a preset interrupt signal generation condition is satisfied, the pulse counter 100 generates the interrupt signal and transmits the interrupt signal to the processor 140.

When the interrupt signal is generated, the processor 140 enters the active mode from the sleep mode (S504).

When the count value of the pulse counter 100 is different from a previous count value, the processor 140 transmits the count value to the external device 160 (S506). The processor 140 transmits the count value to the external device 160 via the communication unit 150 that may use a wired/wireless network.

The processor 140 sets the number of pulses which is the interrupt signal generation condition of the pulse counter 100, and switches from the active mode to the sleep mode (S508).

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Various implementations of the systems and methods described herein may be realized through digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions to and from a storage system, at least one input device, and at least one output device, wherein the programmable processor may be a special-purpose processor or a general-purpose processor. Computer programs (which are also known as programs, software, software applications or code) contain instructions for a programmable processor and are stored in a "computer-readable recording medium."

The computer-readable recording medium refers to any computer program product, apparatus, and/or device (e.g., non-volatile or non-transitory recording medium such as CD-ROM, ROM, memory card, hard disk, an optical/magnetic disk, storage devices, and the like) used to provide instructions and/or data to a programmable processor.

Various implementations of the systems and techniques described herein can be realized by a programmable computer. Here, the computer includes a programmable processor, a data storage system (including volatile memory, nonvolatile memory, or any other type of storage system or a combination thereof) and at least one communication interface. For example, the programmable computer may be one of a server, a network device, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. A pulse counting apparatus comprising:
a pulse counter configured to count a number of pulses inputted from outside of the pulse counting apparatus and generate an interrupt signal;
a timer unit configured to generate a wake-up signal according to a preset time;
a real time clock (RTC) configured to serve as a clock of the pulse counter and the timer unit;
a processor configured to switch from a sleep mode to an active mode when the interrupt signal or the wake-up signal is generated, and
a communication unit configured to communicate to both the processor and a network,
wherein the processor compares a current count value comprised of the number of accumulated pulses of the pulse counter, with a previous count value transmitted to an external device that is connected to the communication unit, and transmits the current count value to the external device through the communication unit when the current count value is not equal to the previous count value.

2. The pulse counting apparatus as claimed in claim 1, wherein the sleep mode is a mode in which the pulse counter, the timer unit, and the RTC operate.

3. The pulse counting apparatus as claimed in claim 2, wherein the processor switches from the sleep mode to the active mode only by the interrupt signal when a period of the pulses is longer than a predetermined value.

4. The pulse counting apparatus as claimed in claim 2, further comprising:
an oscillator configured to have a maximum operating frequency higher than the RTC,
wherein the processor selects the RTC or the oscillator as a clock of the pulse counter according to a frequency of the pulses.

5. The pulse counting apparatus as claimed in claim 1, wherein the interrupt signal is generated according to the current count value of the pulse counter.

6. A pulse counting apparatus comprising:
a pulse counter configured to count a number of pulses inputted from outside of the pulse counting apparatus and generate an interrupt signal;
a timer unit configured to generate a wake-up signal according to a preset time;
a real time clock (RTC) configured to serve as a clock of the pulse counter and the timer unit;
a processor configured to switch from a sleep mode to an active mode when the interrupt signal or the wake-up signal is generated, and
a communication unit configured to communicate to both the processor and a network,
wherein the processor compares a current count value comprised of the number of accumulated pulses of the pulse counter with a previous count value transmitted to an external device that is disconnected from the communication unit, when the current count value is equal to the previous count value, executes a full boot code, reconnects the external device to the communication unit, and transmits the current count value to the external device through the communication unit.

7. A method for operating a pulse counting apparatus, comprising:
counting a number of pulses inputted from outside of the pulse counting apparatus and generating an interrupt signal according to an interrupt signal generation condition;
generating a wake-up signal according to a preset time;
switching a processor from a sleep mode to an active mode when the interrupt signal or the wake-up signal is generated; and
comparing a current count value comprised of the number of accumulated pulses of the pulse counter with a previous count value transmitted to an external device that is connected to the pulse counting apparatus,
wherein a power of the processor is off in the sleep mode,
when the current count value is not equal to the previous count value, transmitting the current count value to the external device, setting the preset time, and switching the processor from the active mode to the sleep mode; and
when the current count value is equal to the previous count value, setting the interrupt signal generation condition and switching the processor from the active mode to the sleep mode.

8. The method as claimed in claim 7, wherein the interrupt signal is generated according to the current count value of the pulse counter.

9. The method as claimed in claim 7, further comprising:
selecting the RTC or the oscillator as a clock of the pulse counting apparatus according to a frequency of the pulses.

10. The method as claimed in claim 7, wherein the processor is switched from the sleep mode to the active mode only by the interrupt signal when a period of the pulses is longer than a predetermined value.

11. A method for operating a pulse counting apparatus, comprising:
counting a number of pulses inputted from outside of the pulse counting apparatus and generating an interrupt signal according to an interrupt signal generation condition;
generating a wake-up signal according to a preset time;
switching a processor from a sleep mode to an active mode when the interrupt signal or the wake-up signal is generated; and
comparing a current count value comprised of the number of accumulated pulses of the pulse counter with a previous count value transmitted to an external device that is disconnected from the pulse counting apparatus,
wherein a power of the processor is off in the sleep mode,
when the current count value is not equal to the previous count value, setting the preset time and switching the processor from the active mode to the sleep mode; and
when the current count value is equal to the previous count value, executing a full boot code, transmitting the current count value to the external device that is reconnected to the pulse counting apparatus, setting the interrupt signal generation condition, and switching the processor from the active mode to the sleep mode.

* * * * *